(12) United States Patent
Hsu et al.

(10) Patent No.: US 12,347,225 B2
(45) Date of Patent: Jul. 1, 2025

(54) OPTICAL FINGERPRINT SENSOR WITH HIGH ASPECT-RATIO METAL APERTURE STRUCTURES

(71) Applicant: OmniVision Technologies, Inc., Santa Clara, CA (US)

(72) Inventors: Shih-Hsin Hsu, Taipei (TW); Jau-Jan Deng, Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 14 days.

(21) Appl. No.: 17/702,675

(22) Filed: Mar. 23, 2022

(65) Prior Publication Data

US 2023/0306778 A1   Sep. 28, 2023

(51) Int. Cl.
| | |
|---|---|
| *G06V 40/13* | (2022.01) |
| *G02B 1/11* | (2015.01) |
| *G02B 3/00* | (2006.01) |
| *G02B 5/20* | (2006.01) |

(52) U.S. Cl.
CPC ............ *G06V 40/1318* (2022.01); *G02B 1/11* (2013.01); *G02B 3/0075* (2013.01); *G02B 5/208* (2013.01)

(58) Field of Classification Search
CPC .... G06V 40/1318; G02B 1/11; G02B 3/0075; G02B 5/208
See application file for complete search history.

(56) References Cited

U.S. PATENT DOCUMENTS

| | | | |
|---|---|---|---|
| 10,108,841 B2 | 10/2018 | Lee et al. | |
| 10,474,867 B2 | 11/2019 | Yeke Yazdandoost et al. | |
| 10,515,253 B2 | 12/2019 | Chen et al. | |
| 11,747,665 B2* | 9/2023 | Matsunaga | G06V 40/1318 |
| | | | 345/156 |
| 2007/0164279 A1* | 7/2007 | Lin | H01L 24/94 |
| | | | 257/E23.021 |

(Continued)

FOREIGN PATENT DOCUMENTS

| | | | | |
|---|---|---|---|---|
| CN | 1901214 A | * | 1/2007 | ......... H01L 27/1462 |
| CN | 109638011 A | * | 4/2019 | ......... H01L 27/0296 |

(Continued)

OTHER PUBLICATIONS

English translation of CN-113764442-A (Year: 2021).*

(Continued)

*Primary Examiner* — Lixi C Simpson
(74) *Attorney, Agent, or Firm* — COZEN O'CONNOR

(57) ABSTRACT

An under-display optical fingerprint sensors employing microlens arrays (MLAs) and an opaque aperture layer includes high aspect-ratio metal aperture structures for efficient angular signal filtering and stray light control. Instead of relying on one or more opaque aperture baffle-layers, embodiments disclosed herein utilize an image sensor's inherent metal layers for filtering signals originated from unwanted angular ranges and blocking undesired stray light could achieve similar or better performance with simplified process flow and lower cost. Layers from the sensors' inherent metal layers are brought into the sensing area on purpose to form the high aspect-ratio metal aperture structure. The metal layers in the sensing area may include apertures aligned to apertures in the opaque layer, and may also be grounded.

17 Claims, 12 Drawing Sheets

FIG. 7

(56) References Cited

U.S. PATENT DOCUMENTS

| | | | |
|---|---|---|---|
| 2014/0035812 A1* | 2/2014 | Skurnik | G06F 3/0304 |
| | | | 345/156 |
| 2018/0012069 A1* | 1/2018 | Chung | G06V 40/1394 |
| 2018/0157889 A1* | 6/2018 | MacDonald | G06V 40/13 |
| 2018/0270403 A1* | 9/2018 | Chung | H04N 23/54 |
| 2022/0050994 A1* | 2/2022 | Zhang | G02B 5/005 |
| 2022/0336510 A1* | 10/2022 | Hai | H01L 27/14603 |
| 2023/0236342 A1* | 7/2023 | Lee | G06V 40/1318 |
| | | | 382/124 |

FOREIGN PATENT DOCUMENTS

| | | | |
|---|---|---|---|
| CN | 113327950 A | * | 8/2021 |
| CN | 113764442 A | * | 12/2021 |

OTHER PUBLICATIONS

English translation of CN-1901214-A (Year: 2007).*
English translation of CN-113327950A (Year: 2021).*
English translation of CN-109638011-A (Year: 2019).*

* cited by examiner

OPTICAL FINGERPRINT SENSOR WITH HIGH ASPECT-RATIO METAL APERTURE STRUCTURES

BACKGROUND

Conventional under-display optical fingerprint sensors based on collimators require multiple apertured opaque layers separated by transparent layers to limit the numerical aperture and control the crosstalk between adjacent sensing pixels. The fabrication of multiple aperture and separation layers uses relatively expensive lithography processes and thus is not always favorable to cost, size, and other factors.

Another approach used with optical fingerprint sensors is using pinholes as light pipes to guide a signal down to the sensing elements, or photodiodes. The fabrication processes to create light pipes include hole drilling/etching and material filling, which are complicated and also not cost effective.

In typical front-side illumination (FSI) image sensors, which could be realized by the technology referred to as 1P3M (1 poly/3 metal layers) or 1P4M (1 poly/4 metal layers) structures, the metal lines above the optical sensing area, or pixels are relatively scarce so as not to block incident light. For conventional collimator-type optical fingerprint sensors, only the top metal layer (M3 or M4) is utilized as an aperture layer for imaging.

SUMMARY

In a first aspect, under-display optical fingerprint sensors employing microlens arrays (MLAs) and an opaque aperture layer including one or more opaque aperture baffle-layers, may also include high aspect-ratio metal aperture structures for efficient angular signal filtering and stray light control. Instead of completely relying on opaque materials and apertures, embodiments disclosed herein utilize an image sensor's inherent metal layers for filtering signals originated from unwanted angular ranges and blocking undesired stray light could achieve similar or better performance with simplified process flow and lower cost. Layers from the sensors' inherent metal layers are brought into the sensing area on purpose to form the high aspect-ratio metal aperture structure. The metal layers in the sensing area may include apertures aligned to apertures in the opaque layer, and may also be grounded.

In a further aspect, the metal aperture structure has an aspect ratio $h/d \geq 1$, where h is a height of the metal aperture structure between a surface of the image sensor and a top surface of an uppermost grounded metal aperture layer farthest from the image sensor, and d is a diameter of the aperture stops in the uppermost grounded metal aperture layer. The metal aperture structure includes two to four grounded metal aperture layers and may also include one or more anti-reflection layers deposited upon and beneath the grounded metal aperture layers.

In another aspect, the grounded metal aperture layers have a thickness $t_m$, the dielectric layer has a thickness of $t_d$, and $t_m/t_d \leq 1$.

Further, an optical fingerprint sensor as disclosed herein may include an infrared cutoff filter (IRCF) layer.

DETAILED DESCRIPTION OF THE EMBODIMENTS

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the terms "below" and "under" may encompass both an orientation of above and below. The device may be otherwise oriented (rotated ninety degrees or at other orientations) and the spatially relative descriptors used herein interpreted accordingly. In addition, it will also be understood that when a layer is referred to as being "between" two layers, it may be the only layer between the two layers, or one or more intervening layers may also be present.

The term semiconductor substrate may refer to substrates formed using semiconductors such as silicon, silicon-germanium, germanium, gallium arsenide, and combinations thereof. The term semiconductor substrate may also refer to a substrate, formed of one or more semiconductors, subjected to previous process steps that form regions and/or junctions in the substrate. A semiconductor substrate may also include various features, such as doped and undoped semiconductors, epitaxial layers of silicon, and other semiconductor structures formed upon the substrate.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meanings.

Figure 1:
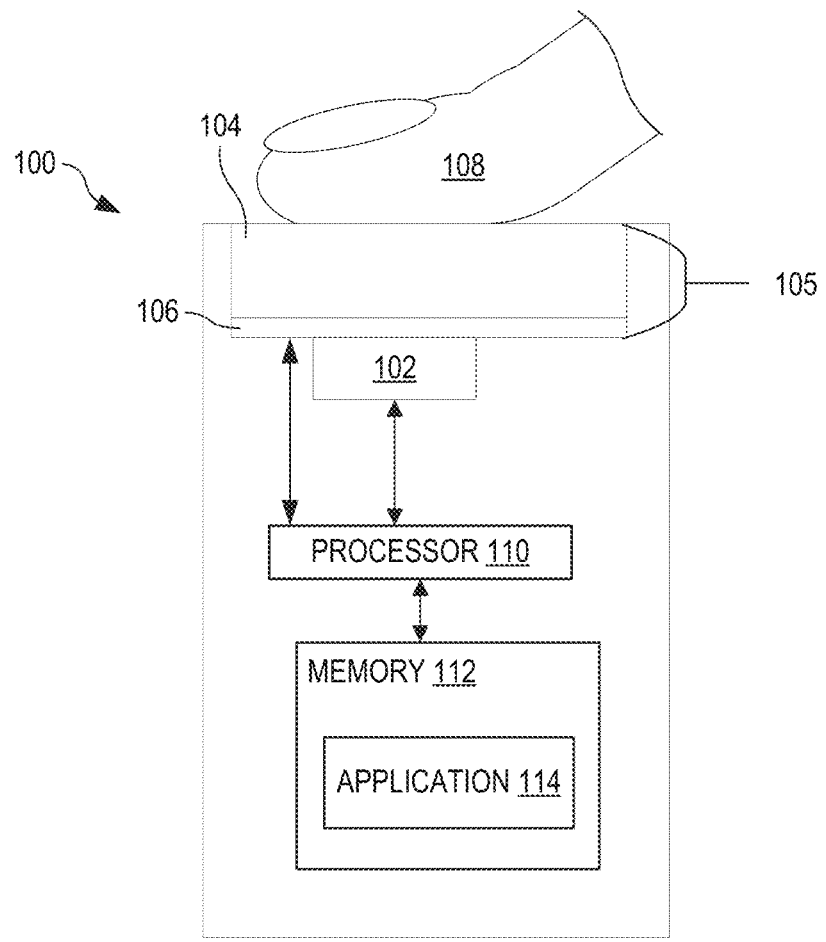
FIG. 1 illustrates a finger being scanned by the optical fingerprint sensor installed below the screen of a mobile device, according to an embodiment.

FIG. 1 illustrates an electronic device 100 with an optical fingerprint sensor 102 installed below a display 105 including a cover glass 104 and a light-emitting layer 106. A fingerprint sample 108 is being scanned by optical fingerprint sensor 102. In an embodiment, electronic device 100 may be a mobile phone, tablet, or other electronic device with a display. In an embodiment, light-emitting layer 106 illuminates fingerprint sample 108 with a non-uniform illumination pattern including one or more of (i) alternating light and dark lines, (ii) spots of illumination, and (iii) illuminating only portions of the fingerprint sample for example only one edge of the fingerprint sample. The non-uniform pattern of illumination aids in determining the angular distribution emitted by the fingerprint sample 108.

Electronic device 100 includes a processor 110 communicatively coupled to light-emitting layer 106, optical fingerprint sensor 102, and memory 112. Memory 112 stores an application 114 (e.g., software/firmware) that include machine readable instructions that, when executed by processor 110, cause light-emitting layer 106 and optical fingerprint sensor 102 to capture an image of a fingerprint sample 108.

Figure 2:
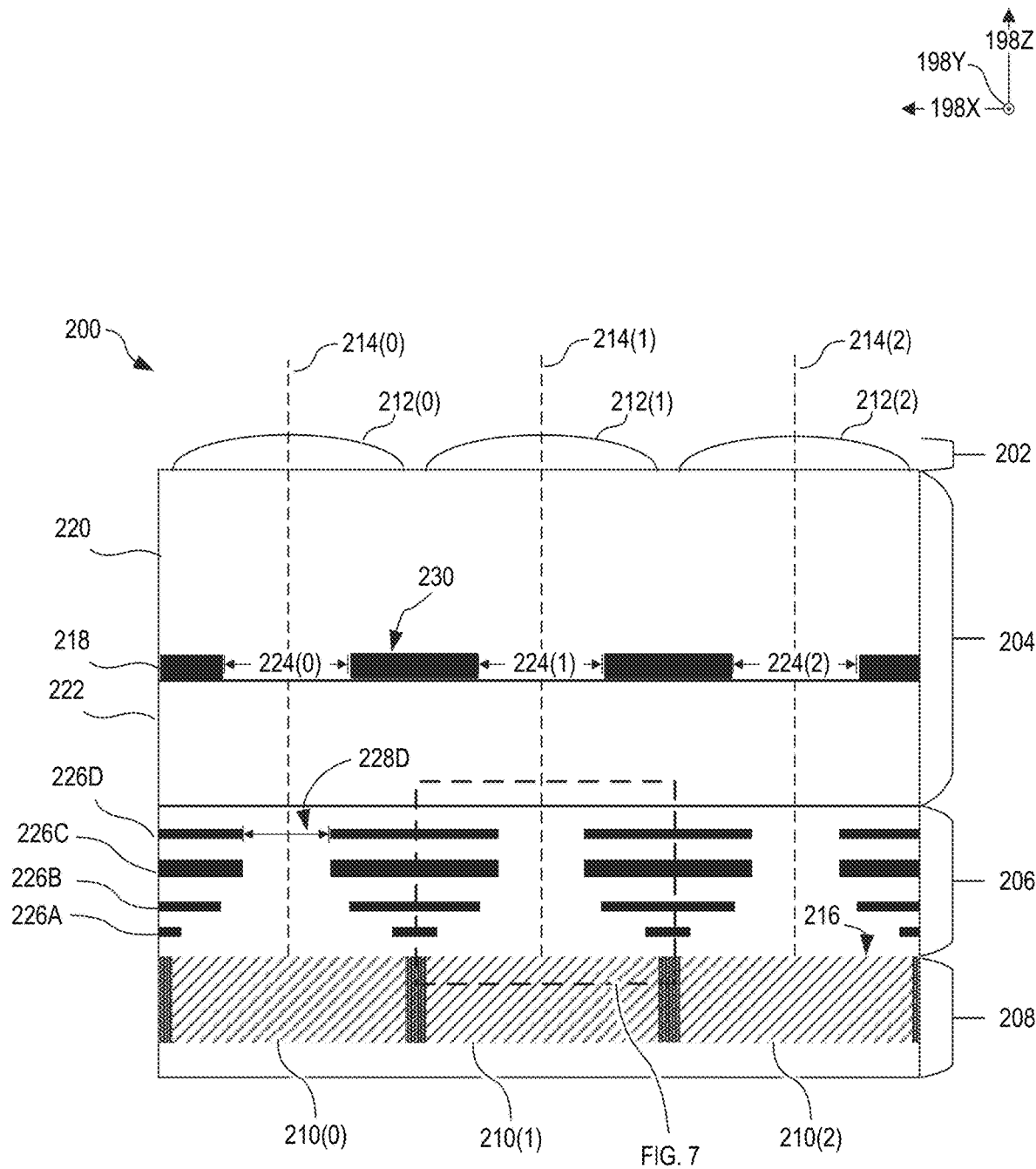
FIG. 2 illustrates a cross-sectional side view of an optical fingerprint sensor with a high aspect-ratio metal aperture structure, in embodiments.

FIG. 2 illustrates a cross-sectional side view of an optical fingerprint sensor 200 with a high aspect-ratio metal aperture structure. The cross section illustrated in FIG. 2 is parallel to a plane, hereinafter the x-z plane, formed by orthogonal axes 198X and 198Z, which are each orthogonal to an axis 198Y. A plane, hereinafter the x-y plane, formed by orthogonal axes 198X and 198Y, and planes parallel to the x-y plane are referred to as horizontal planes. Unless otherwise specified, heights of objects herein refer to the object's extent along axis 198Z. Herein, a reference to an axis x, y, or z refers to axes 198X, 198Y, and 198Z respectively. Also, herein, a width refers to an object's extent along the x axis, a depth refers to an object's extent along the y axis, a thickness (of thinness) refers to an object's extent along the z axis, and vertical refers to a direction along the z axis. Also, herein, above refers to a relative position a distance away along the axis 198Z in the positive direction and below refers to a relative position a distance away along the axis 198Z in the negative direction.

Optical fingerprint sensor 200 includes an opaque aperture layer 204, a metal aperture structure 206 and an image sensor 208. In embodiments, optical fingerprint sensor 200 also includes a microlens array (MLA) 202. Image sensor 208 includes a pixel array of J photodiodes 210(0), 210(1), 210(2) . . . 210(J−1). MLA 202 includes a plurality of K microlenses, 212(0), 212(1), 212(2) . . . 212(K−1). Each microlens 212 has an axis 214(0), 214(1), 214(2) . . . 214(K−1) that is parallel to axis 198Z. Microlenses 212 are positioned above a light-sensitive surface 216 of image sensor 208 to focus light on image sensor 208. In embodiments, one microlens 212 and the corresponding apertures underneath it may cover one photodiode 210 (J=K), or more than one photodiode (210) of image sensor 208 (J>K). The plurality of photodiodes 210 detect light that is reflected from a fingerprint sample; this detected light is then used to generate a fingerprint image.

As shown in FIG. 2, opaque aperture layer 204 includes a baffle-layer 218 with a plurality of aperture stops 224. Transparent layer 220 is between baffle-layer 218 and MLA 212. Transparent layer 222 is between opaque baffle-layer 218 and metal aperture structure 206. Baffle-layer 218 is located at a respective height above and is parallel to light-sensitive surface 216. In embodiments, opaque aperture layer 204 may include a plurality of baffle-layers 218 with corresponding transparent layers, as will be discussed further below. Each aperture stop 224 is center-aligned with a respective optical axis 214.

In embodiments, a high aspect-ratio metal aperture structure is formed from metal layers used for logic wiring and circuitry used when reading pixel data from an optical sensor. An image sensor 208 may include four metal layers, referred to as M1, M2, M3 and M4. Typically, the M2/M3/M4 metal lines of image sensor 208 are only used for sensors' logic circuits but are generally not present in the pixel (sensing) area. As disclosed herein, to form the proposed high aspect-ratio metal aperture structure 206, carefully designed aperture structures formed from the inherent M2, M3, M4 grounded metal aperture layers 226B, 226C and 226D are added. The added M2/M3/M4 metal structures only function as optical apertures but do not have any logic functions. To prevent the additional metal structures from interfering with the sensor's existing signals or introducing any parasitic effects (conductive or resistive), they are grounded.

Metal aperture structure 206 includes at least two grounded metal aperture layers 226. In the embodiment of FIG. 2, metal aperture structure 206 includes four grounded metal aperture layers 226A, 226B, 226C and 226D. In embodiments, metal aperture structure 206 may include more or fewer grounded metal aperture layers. In embodiments, grounded metal aperture layer 226A may correspond to the M1 layer of image sensor 208, grounded metal aperture layer 226B may correspond to the M2 layer, layer 226C may correspond to the M3 layer and 226D may correspond to the M4 layer. Each grounded metal aperture layer 226A, 226B, 226C and 226D includes corresponding apertures 228A, 228B, 228C and 228D that are center-aligned with respective axis 214. For clarity of illustration, only one aperture 228D is indicated in FIG. 2 but each grounded metal aperture layer 226 includes equivalent apertures centered on a respective axis 214.

As discussed herein, MLA 212 is referred to as being at the top of optical fingerprint sensor 200 while image sensor 208 is referred to as being at the bottom of optical fingerprint sensor 200. Therefore, the top surface of any layer is the surface that is closer to MLA 212, as shown at 230 for baffle-layer 218.

In embodiments, metal aperture structure 206 includes a number of grounded metal aperture layers m≥2 where m is the number of the metal layers with apertures for angular filtering and blocking of stray light. Further, metal aperture layer 206 has an aspect ratio of $h/d \geq 1$ where h is the height of the metal structure (distance between the top surface of the uppermost metal and the surface of the photodiode), and d is the diameter of the uppermost metal aperture. Further, grounded metal aperture layer 206 has a thickness ratio of $t_m/t_d \leq 1$, where $t_m$ is the thickness of a metal layer, $t_d$ is the thickness of the underneath dielectric layer (distance between the upper and lower metal layers). With a smaller thickness ratio, stray light is less likely to hit the sidewall of a metal aperture of structure 206. In embodiments discussed in connection with FIG. 7, a metal aperture structure 206 may have a reflectance of R≤5%, where R is the reflectance of a grounded metal aperture layer with an anti-reflection layer. Typical reflectance of metals is at least 30% and could be as high as 90%, which can contribute to multiple reflections. With a low-reflective metal layer, discussed in more detail below, the effect of multiple reflections becomes negligible.

Figure 3:
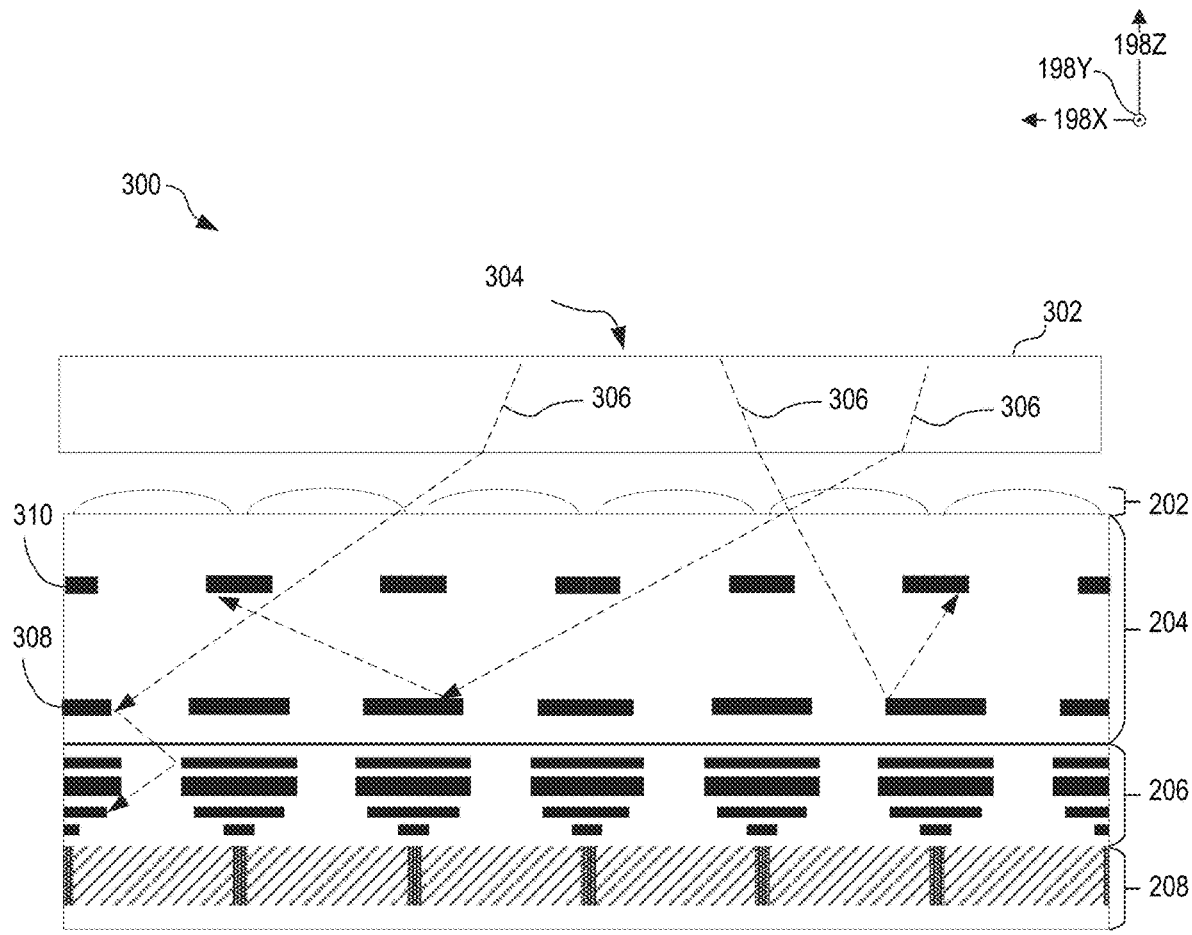
FIG. 3 illustrates a representative transmission of light within the optical fingerprint sensor of FIG. 2.

FIG. 3 illustrates a representative transmission of light within an optical fingerprint sensor 300. Optical fingerprint sensor 300 is an example of optical fingerprint sensor 200 of FIG. 2 with two baffle-layers 308, 310 instead of one baffle-layer 218. In addition to MLA 202, opaque aperture layer 204, metal aperture structure 206, and image sensor 208, FIG. 3 includes a display glass 302, which is an example of cover glass 104 of FIG. 1. Display glass 302 has a top surface 304, which is an object plane for capturing a user's fingerprint. Opaque aperture layer 204 as shown in FIG. 3 includes two baffle layers 308 and 310, although any number of baffle-layers may be used. Examples of stray light 306 are shown entering optical fingerprint sensor 300 through display glass 302. As shown, one or more baffle-layers in opaque aperture layer 204, together with metal aperture structure 206, provide for efficient angular signal filtering and stray light control. Instead of completely relying on multiple opaque materials and apertures, utilizing an image sensor's inherent metal layers M1, M2, M3 and/or M4 in metal aperture structure 206 for filtering signals originated from unwanted angular ranges and blocking undesired stray light provides similar or better performance to a greater number of baffle-layers in opaque aperture layer 204 with simplified process flow and lower cost.

Figure 4A:
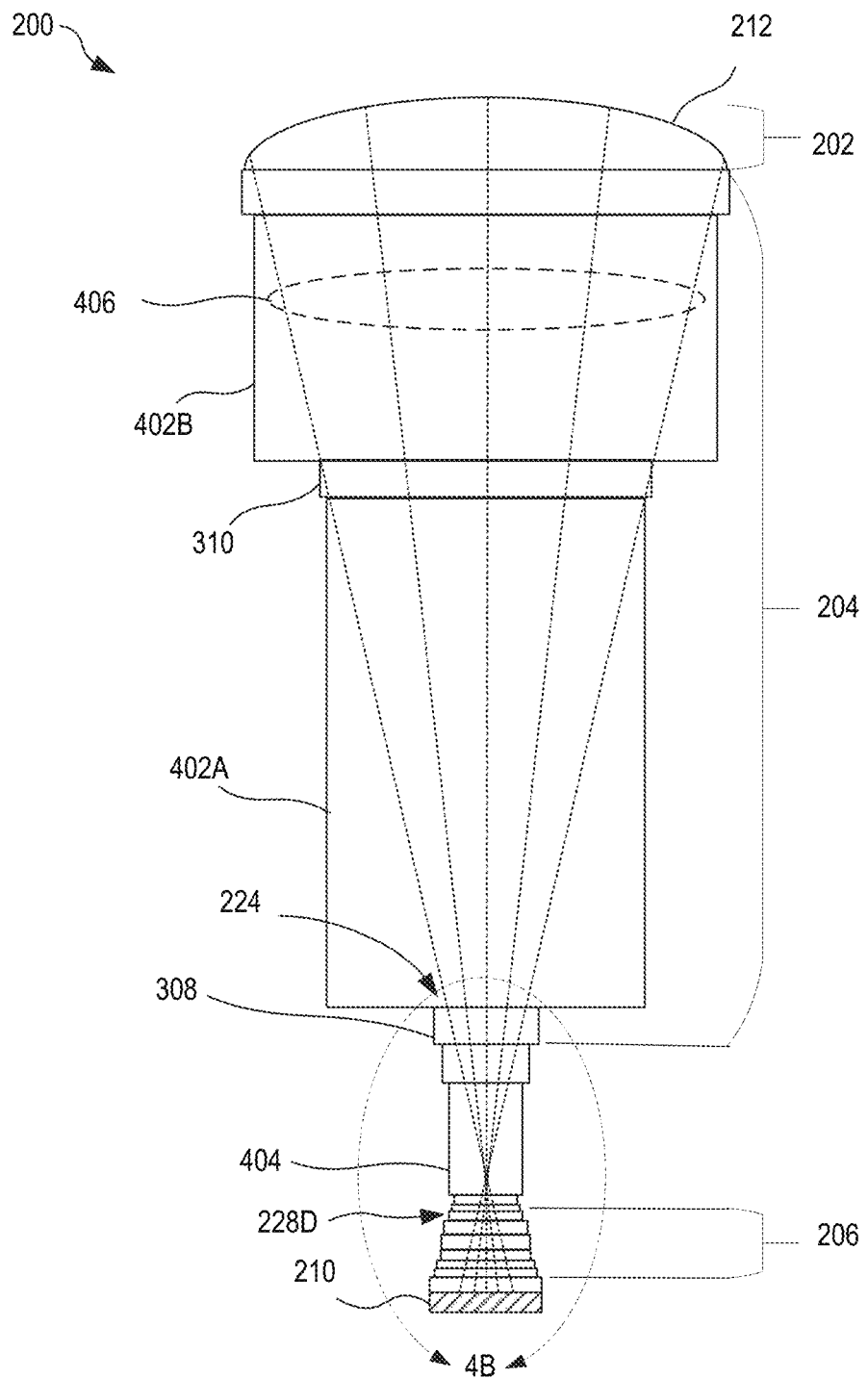
FIG. 4A is a schematic cross-sectional view of part of single aperture optical fingerprint sensor and a ray bundle, in embodiments.
Figure 4B:
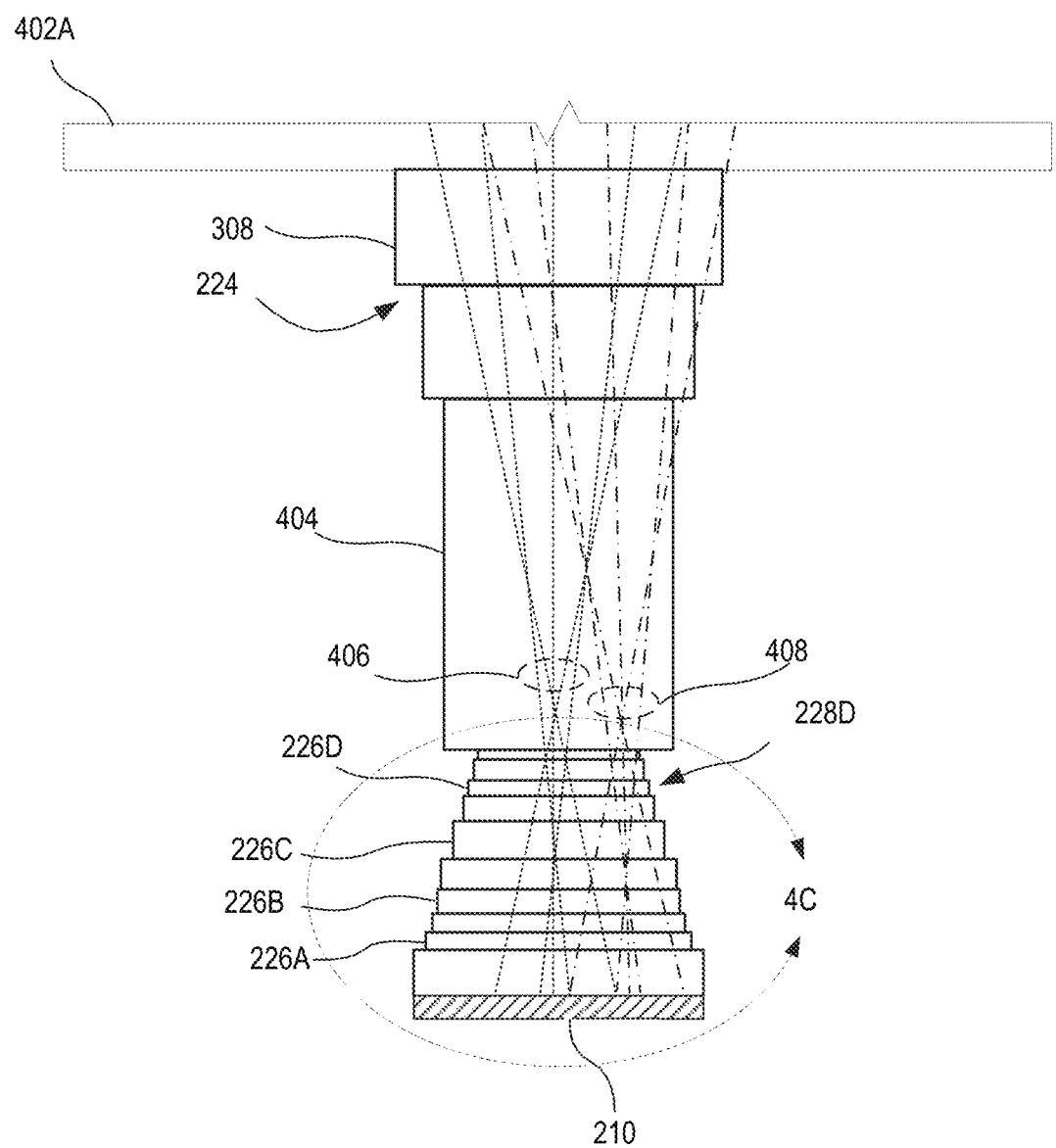
FIG. 4B is an expanded view of a portion of FIG. 4A.
Figure 4C:
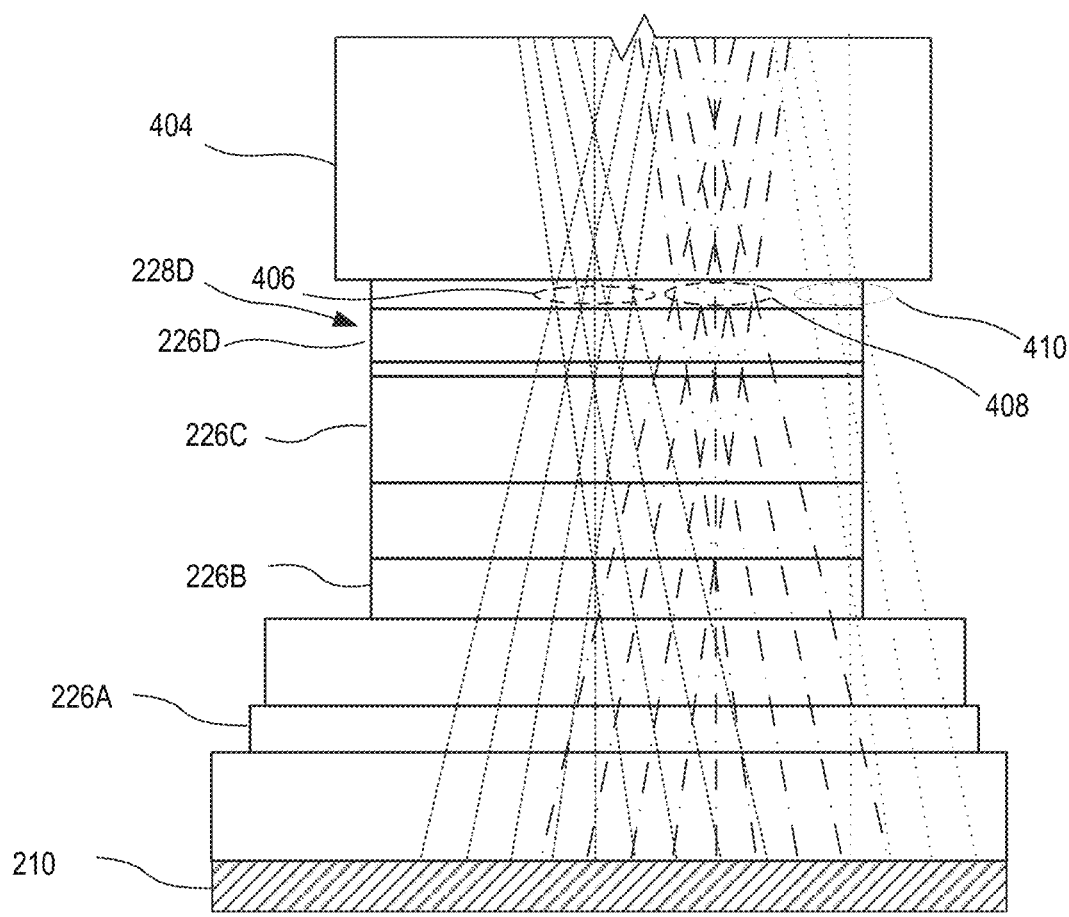
FIG. 4C is an expanded view of a portion of FIG. 4B.

FIG. 4A is a schematic cross-sectional view of part of optical fingerprint sensor 300 illustrating a single aperture of two opaque baffle-layers 308 and 310 between microlens 212 and photodiode 210. FIG. 4B is an expanded view of a portion of FIG. 4A. FIG. 4C is an expanded view of a portion of FIG. 4B. FIGS. 4A-4C are best viewed together in the following discussion. Various layers in an optical fingerprint sensor are discussed herein, but specific embodiments shown in the figures are for purposes of illustration only. Any number of layers may be used in any of the embodiments disclosed.

FIGS. 4A-4C illustrate a series of apertures schematically as blocks through which rays of electromagnetic energy forming light bundles 406, 408 and 410 pass. The apertures are center-aligned with an optical axis of microlens 212 as described above. In the embodiment of FIGS. 4A-4C, opaque aperture layer 204 includes two baffle-layers 308 and 310, as well as two transparent layers 402A and 402B. Metal aperture structure 206 includes four metal layers, generally separated by dielectric layers as will be discussed in more detail below. More or fewer layers could be included in either opaque aperture layer 204 or metal aperture structure 206.

The spot size created by light bundles 406, 408 and 410 passing through microlens 212 reaches a minimum approximately at the top metal layer 226D, also referred to as the M4 layer, and then gradually increases. The spot size is determined by the chief and marginal rays of light bundle 406 entering from the microlens 212 directly above the top metal aperture, i.e., the microlens aligned with the same optical axis 214. The additional apertures in metal layers 226C and/or 226B (also referred to as M3 layer and/or M2 layer) are generally of the same size as or larger than apertures of top metal layer 226D. Therefore, apertures in metal aperture layers 226C and 226B will not significantly modify the collimator's light collecting ability, but will boost its performance by suppressing stray light entering through microlens 212.

When the sizes of the extra apertures in the lower metal layers 226C and 226B are properly designed, in addition to mitigating stray light arriving from angles outside the collimator's field of view (FOV), they may also act as baffles to vignette aberrated rays and thus enhance the image quality and/or modulation transfer function (MTF) without significantly impacting the signal intensity.

Figure 5A:
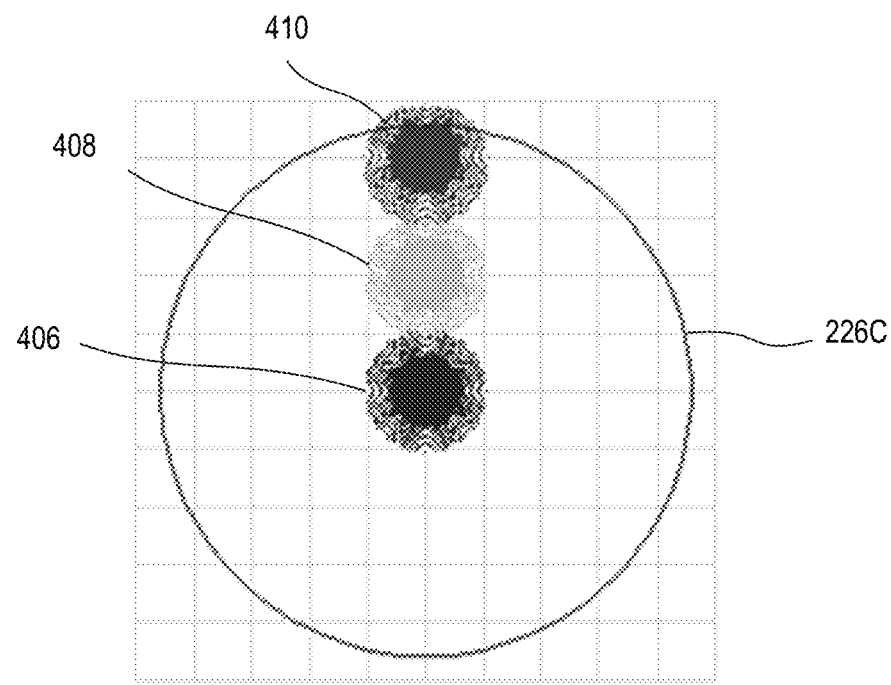
FIGS. 5A and 5B are beam footprint diagrams showing a top view of the single aperture optical fingerprint sensor and light bundles of FIG. 4C, in embodiments.
Figure 5B:
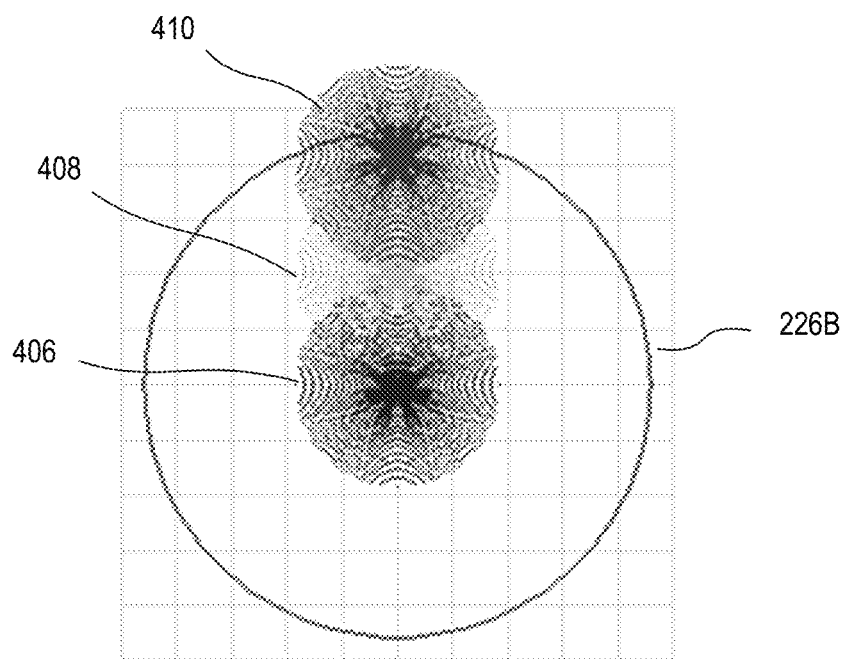

FIGS. 5A and 5B are beam footprint diagrams showing a top view of the single aperture optical fingerprint sensor 200 and light bundles 406, 408 and 410 of FIGS. 4A-4C, in embodiments. When the sizes of the extra apertures in the lower metal layers are properly designed, in addition to mitigating stray light arriving from angles outside the collimator's field of view (FOV), they may also act as baffles to vignette aberrated rays to enhance the image quality, or MTF without significantly impacting the signal intensity. FIG. 5A is a beam footprint diagram of light bundles 406, 408 and 410 at aperture layer 226C, also referred to as the M3 layer. FIG. 5B is a beam footprint diagram of light bundles 406, 408 and 410 at grounded metal aperture layer 226B, also referred to as the M2 layer. As shown, partial light rays from larger incidence angles (outer fields of the FOV) are blocked by aperture layers 226C and 226B.

Figure 6A:
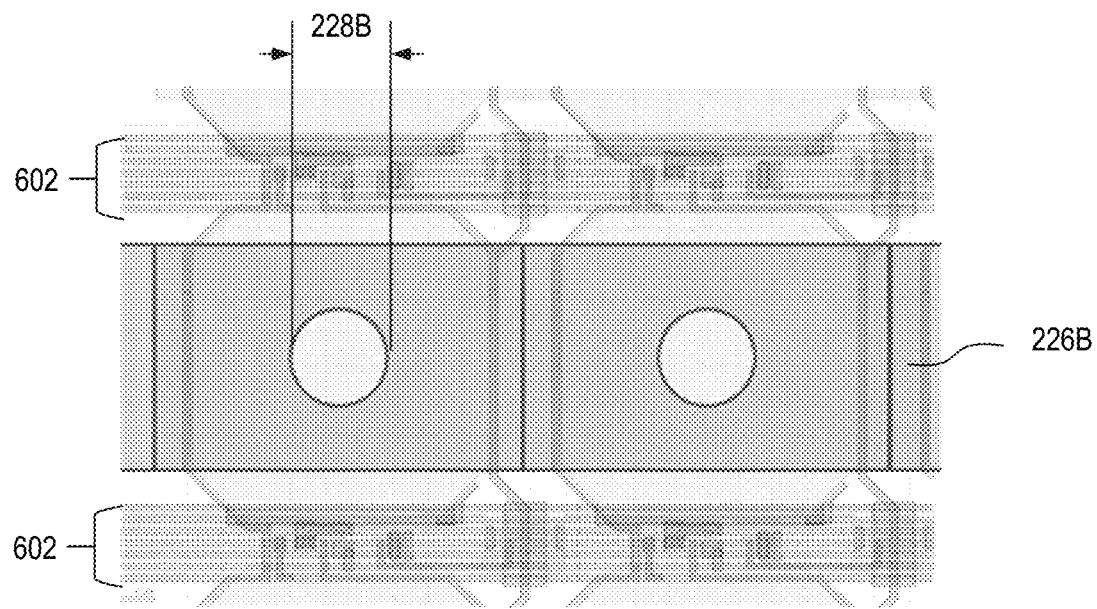
FIGS. 6A and 6B are simplified top layout views of pixels with grounded metal aperture layers, in embodiments.
Figure 6B:
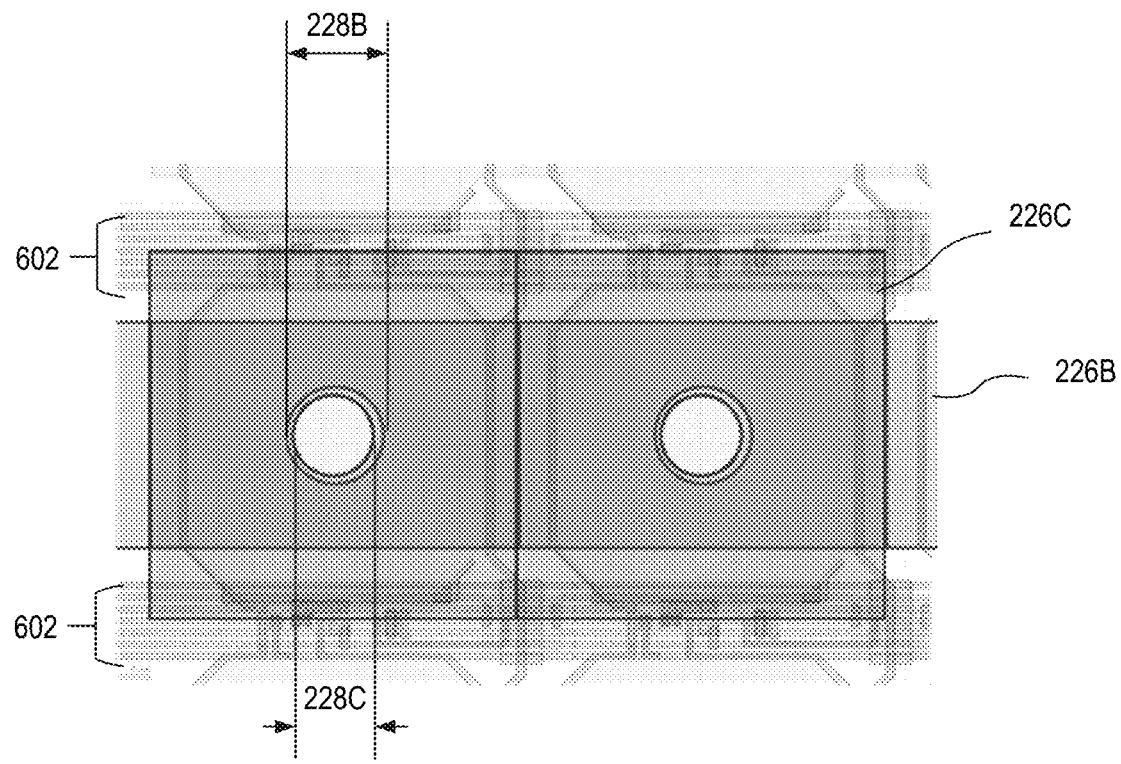

FIGS. 6A and 6B are simplified top layout views of pixels with grounded metal aperture layers. FIG. 6A shows pixels with apertures formed in metal layer M2 and FIG. 6B shows pixels with apertures formed in both metal layers M2 and M3.

FIG. 6A shows a top layout view of two pixels. M2 metal layer 602 represents logic wiring and circuitry to read from and control pixels. Further, grounded metal aperture layer 226B is formed in the M2 layer. Apertures 228B corresponding to each pixel are formed in grounded metal aperture layer 226B. In FIG. 6A, layers M3 and M4 are omitted for clarity.

FIG. 6B shows layers M1 and M2 as in FIG. 6A, and also includes grounded metal aperture layer 226C which is formed in the M3 layer. Apertures 228C corresponding to each pixel are formed in grounded metal aperture layer 226C. In FIG. 6B, layer M4 is omitted for clarity.

Figure 7:
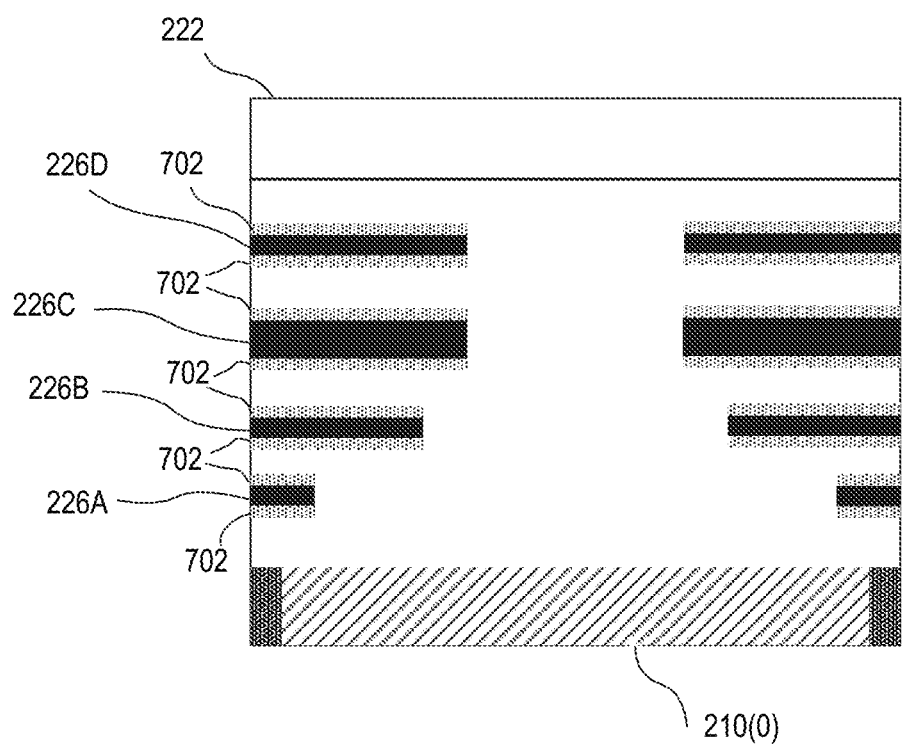
FIG. 7 is a portion of the optical fingerprint sensor of FIG. 2 that includes an anti-reflection layer, in embodiments.

FIG. 7 is a more detailed view of a region of the optical fingerprint sensor of FIG. 2 showing anti-reflection layers 702. Typical metallic materials employed in semiconductor chips, such as aluminum or tungsten, exhibit relatively high reflectance, which could give rise to additional stray light path due to multiple reflections from top or bottom surfaces of metal layers. In order to further suppress stray light and crosstalk from grounded metal aperture layers 226A, 226B, 226C and 226D, efficient anti-reflection layers 702 may be deposited on the top and beneath the metal layers. In embodiments, one or all of grounded metal aperture layers 226A, 226B, 226C and 226D may include an anti-reflection layer 702, and any layer may include an anti-reflection layer 702 on one or both sides.

Figure 8A:
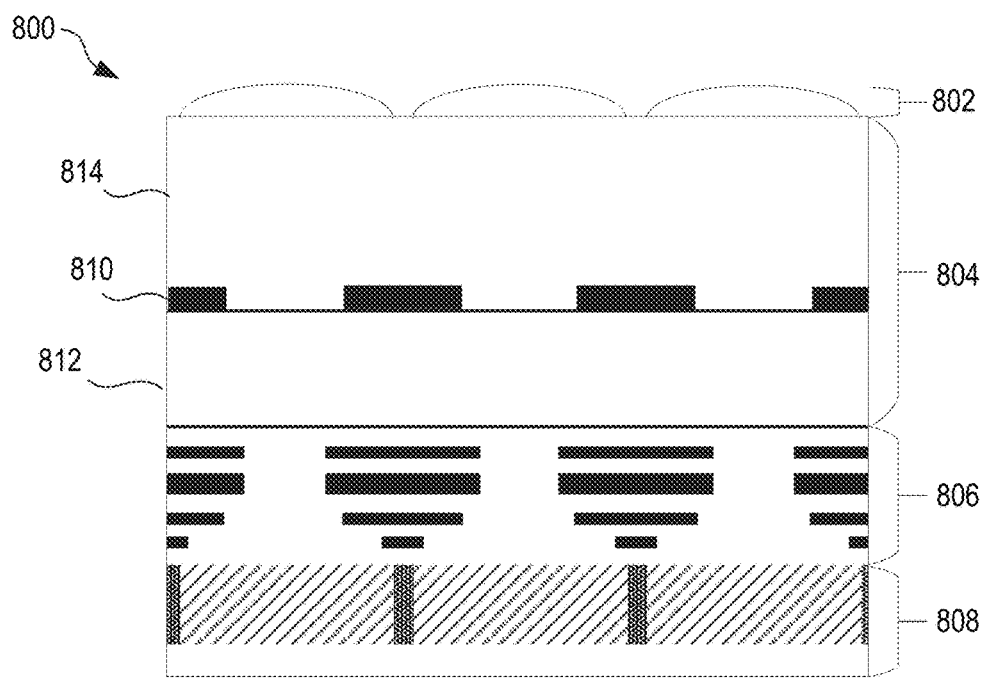
FIGS. 8A-8B are schematic cross-sectional views of optical fingerprint sensors with an opaque aperture layer having a single baffle layer, in embodiments.
Figure 8B:
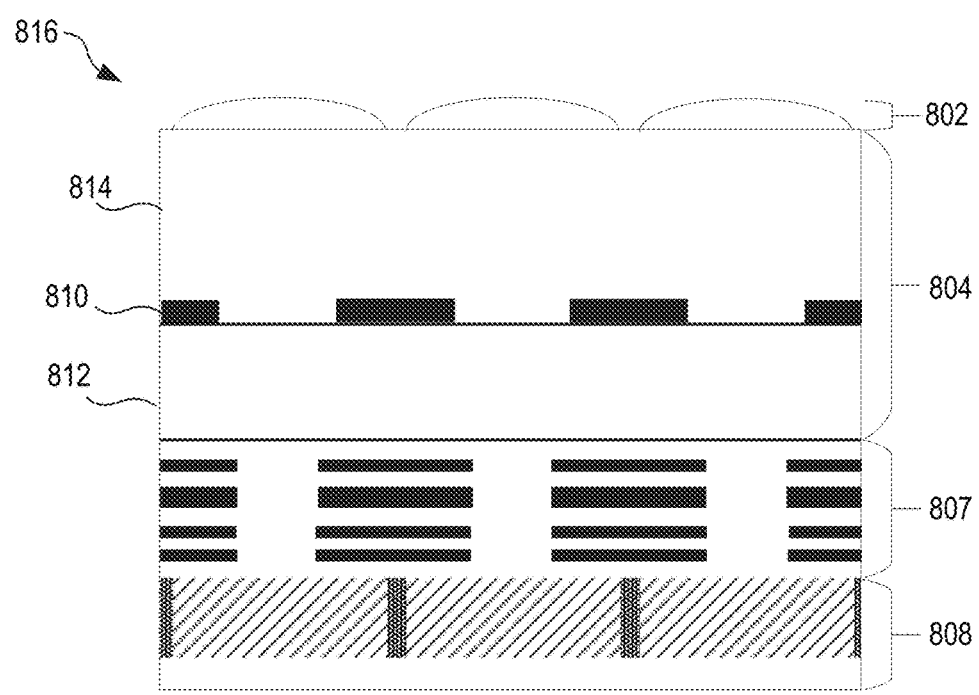

FIGS. 8A-8B, 9A-9B and 10A-10B are schematic cross-sectional views of optical fingerprint sensors that illustrate variations and principles disclosed herein. The optical fingerprint sensors of these figures are examples of the optical fingerprint sensor 200 of FIG. 2. Referring to FIG. 8A, optical fingerprint sensor 800 includes microlens array (MLA) 802, opaque aperture layer 804, metal aperture structure 806 and image sensor 808. In the embodiment of FIG. 8A, opaque aperture layer 804 includes one baffle-layer 810 and two transparent layers 812 and 814. Metal aperture structure 806 includes four grounded metal aperture layers with varying aperture sizes. In FIG. 8B, optical fingerprint sensor 816 includes microlens array (MLA) 802, opaque aperture layer 804 and image sensor 808. Metal aperture structure 807 includes four grounded metal aperture layers with aperture sizes that are the same. Either of optical fingerprint sensors 800 or 816 may include fewer than four grounded metal aperture layers.

Figure 9A:
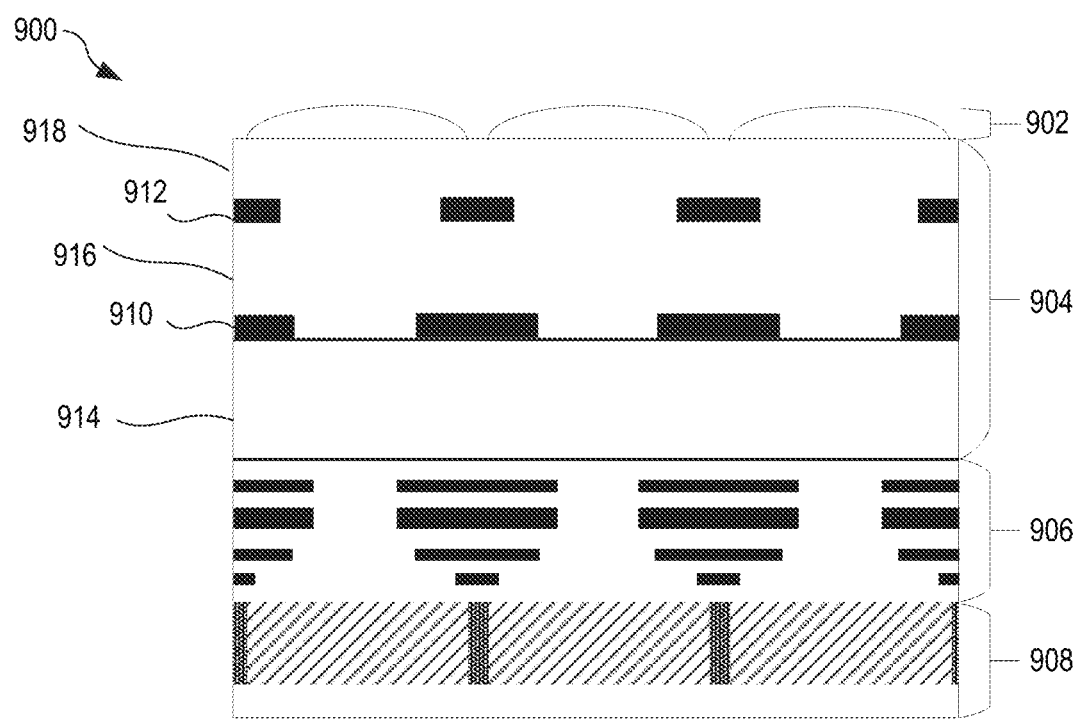
FIGS. 9A-9B are schematic cross-sectional views of optical fingerprint sensors with an opaque aperture layer having two baffle layers, in embodiments.
Figure 9B:
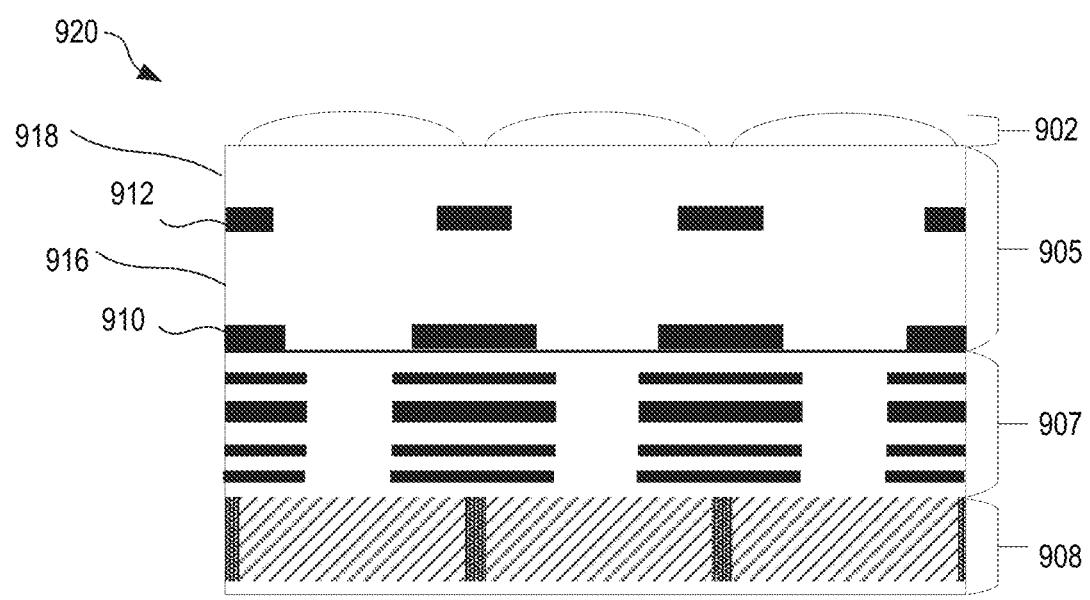

FIGS. 9A-9B are schematic cross-sectional views of optical fingerprint sensors with an opaque aperture layer having two baffle-layers, in embodiments. Optical fingerprint sensors 900 and 920 include microlens array (MLA) 902 and image sensor 908. In FIG. 9A, opaque aperture layer 904 includes two baffle-layers 910 and 912 and three transparent layers 914, 916 and 918. The size of the apertures in baffle-layer 910 varies from the size of the apertures in baffle-layer 912. Metal aperture structure 906 includes four grounded metal aperture layers with varying aperture sizes. In FIG. 9B, opaque aperture layer 905 includes two baffle-layers 910 and 912 and two transparent layers 916 and 918. Metal aperture structure 907 includes four grounded metal aperture layers with aperture sizes that are the same. Either of optical fingerprint sensors 900 or 920 may include less than four grounded metal aperture layers.

Figure 10A:
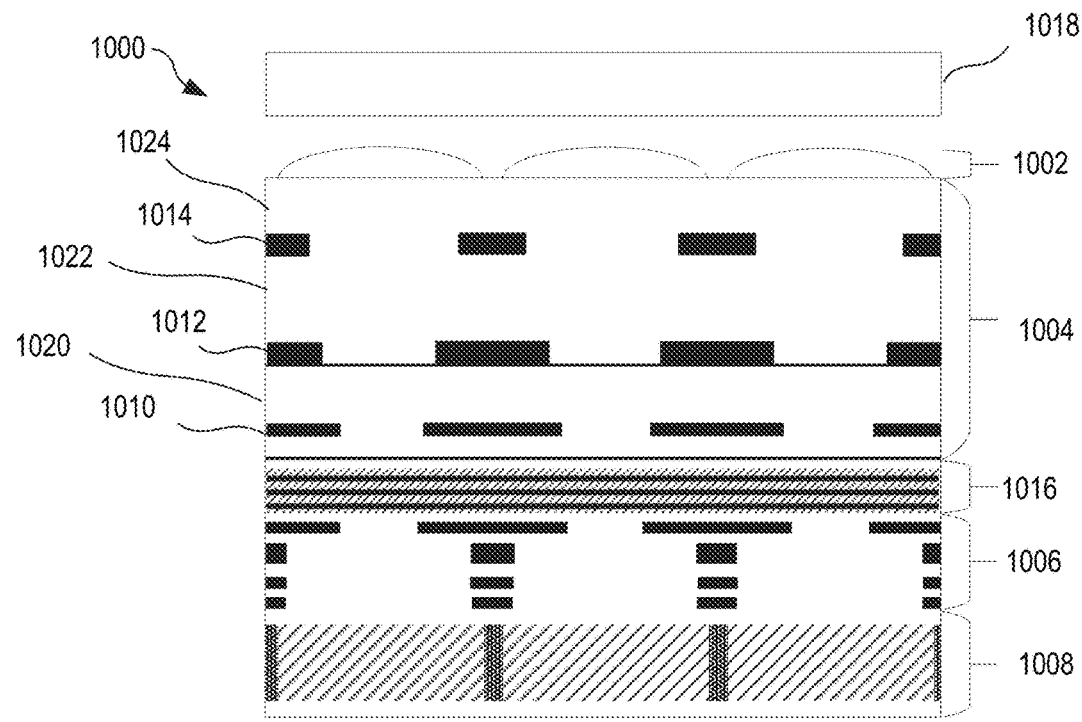
FIGS. 10A-10B are schematic cross-sectional views of optical fingerprint sensors with an opaque aperture layer having three baffle layers and an infrared cutoff filter (IRCF) layer, in embodiments.
Figure 10B:
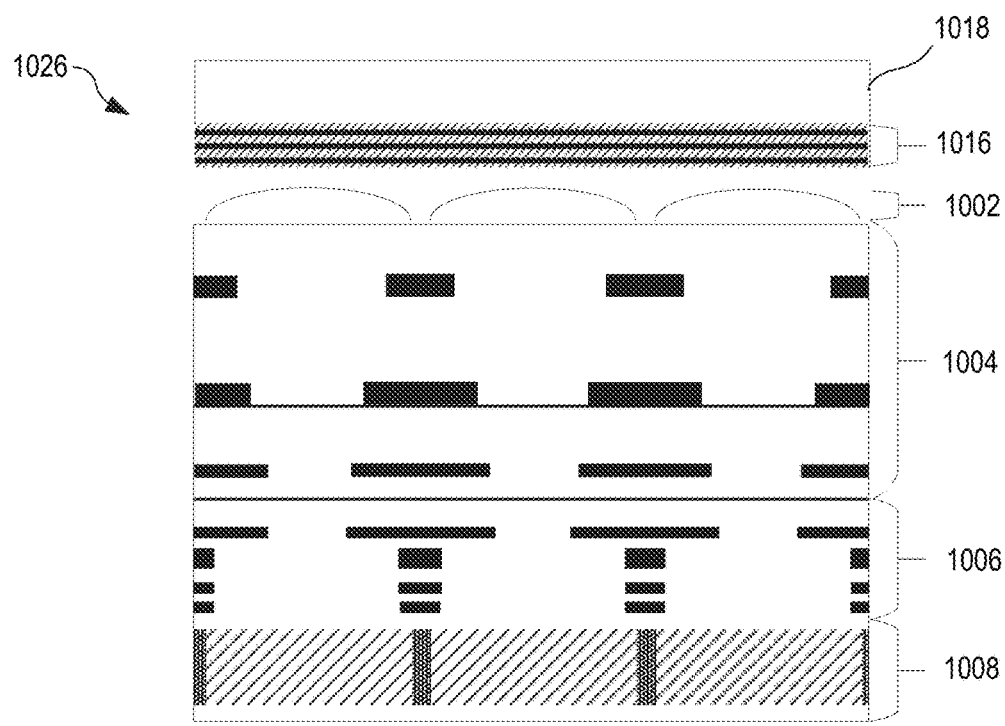

FIGS. 10A-10B are schematic cross-sectional views of optical fingerprint sensors 1000, 1026 with an opaque aperture layer having three baffle-layers and an infrared cutoff filter (IRCF) layer. Optical fingerprint sensors 1000 and 1026 include a microlens array (MLA) 1002, an opaque aperture layer 1004, a metal aperture structure 1006 and an image sensor 1008 that includes an array of photodiodes. Opaque aperture layer 1004 includes three baffle-layers 1010, 1010 and 1014 and three transparent layers 1020, 1022 and 1024. The aperture sizes in baffle-layers 1010, 1012 and 1014 are varying. Metal aperture structure 1006 is an example any of metal aperture structures as discussed herein. In FIG. 10A, ICRF layer 1016 is embedded between opaque aperture layer 204 and metal aperture structure 206. In FIG. 10B, ICRF layer 1016 is positioned immediately below cover glass 1018.

Although specific layers and types of apertures are disclosed, any of the optical fingerprint sensors of FIGS. 8A-8B, 9A-9B and 10A-10B may include between 2 and 4 grounded metal aperture layers, which may have the same or varying aperture sizes.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

Combination of Features

Features described above as well as those claimed below may be combined in various ways without departing from the scope hereof. The following enumerated examples illustrate some possible, non-limiting combinations:

(A1) An optical fingerprint sensor includes an image sensor including a photodiodes array; an opaque aperture layer positioned above the image sensor; and a metal aperture structure comprising two grounded metal aperture layers positioned between the opaque aperture layer and pixel array of photodiodes.

(A2) In sensor (A1), further including a microlens array (MLA) for focusing light from an object plane onto the image sensor through the opaque aperture layer and the metal aperture structure.

(A3) In sensors (A1) or (A2), each of the grounded metal aperture layers correspond to the metal aperture layers of the image sensor and further comprise an array of aperture stops aligned with a respective microlens of the MLA.

(A4) In sensor (A3), the metal aperture structure has an aspect ratio $h/d \geq 1$, where h is a height of the metal aperture structure between a surface of the image sensor and a top surface of an uppermost grounded metal aperture layer farthest from the image sensor, and d is a diameter of the aperture stops in the uppermost grounded metal aperture layer.

(A5) In sensor (A4), the diameter of the aperture stops of the uppermost grounded metal aperture layer is smaller than the diameter of the aperture stops of lower grounded metal aperture layers.

(A6) In sensor (A5), the diameter of the aperture stops of each grounded metal aperture layer is smaller than the diameter of the aperture stops of next lower grounded metal aperture layer.

(A7) In any of sensors (A1)-(A6), the metal aperture structure includes two to four grounded metal aperture layers.

(A8) In any of sensors (A1)-(A7), the grounded metal aperture layers comprise an anti-reflection layer deposited upon and beneath the grounded metal aperture layers.

(A9) In sensor (A8), a reflectance of the grounded metal aperture layers with anti-reflection layers is less than 5 percent.

(A10) In any of sensors (A1)-(A9), the metal aperture structure further comprises a dielectric layer between the grounded metal aperture layers.

(A11) In sensor (A10), the grounded metal aperture layers have a thickness $t_m$, the dielectric layer has a thickness of $t_d$, and $t_m/t_d \leq 1$.

(A12) In any of sensors (A1)-(A11), the opaque aperture layer further comprises one opaque baffle-layer having an array of aperture stops and two transparent layers, and the metal aperture structure further comprises four grounded metal aperture layers each having an array of aperture stops corresponding to the array of aperture stops in the opaque aperture layer.

(A13) In any of sensors (A1)-(A12), the opaque aperture layer further comprises two opaque baffle-layers each having an array of aperture stops and two transparent layers, and the metal aperture structure further comprises four grounded metal aperture layers each having an array of aperture stops corresponding to the arrays of aperture stops in the opaque aperture layer.

(A14) In sensor (A13), the aperture stops in each of three grounded metal aperture layers above the image sensor have the same diameter.

(A15) In any of sensors (A1)-(A14), the opaque aperture layer further comprises two opaque baffle-layers each having an array of aperture stops and three transparent layers, and the metal aperture structure further comprises four grounded metal aperture layers each having an array of aperture stops corresponding to the arrays of aperture stops in the opaque aperture layer.

(A16) In sensor (A15), the aperture stops in each of three grounded metal aperture layers above the image sensor have the same diameter.

(A17) In any of sensors (A1)-(A16), the opaque aperture layer further comprises three opaque baffle-layers each having an array of aperture stops and a diameter of the aperture stops in an upper opaque baffle-layer is wider than a diameter of the aperture stops in a lower opaque baffle layer.

(A18) In any of sensors (A1)-(A17), an infrared cutoff filter (IRCF) layer.

(A19) In sensor (A18), the IRCF layer is embedded between the opaque aperture layer and the metal aperture structure.

(A20) In sensor (A18), a microlens array (MLA) above the opaque aperture layer and a cover glass layer above the MLA, the IRCF layer is coated on a surface of the cover glass layer adjacent to the MLA, and an upper surface of the cover glass layer forms the object plane.

What is claimed is:

1. An optical fingerprint sensor comprising:
   an image sensor including a photodiode array, a metal aperture structure including two grounded metal aperture layers, and circuitry that reads from and controls pixels of the image sensor, the circuitry being both (i) in a same layer as and (ii) adjacent to one of the two grounded metal aperture layers;
   an opaque aperture layer positioned above the image sensor, the two grounded metal aperture layers being between the opaque aperture layer and the photodiode array;
   and
   a microlens array (MLA) for focusing light from an object plane onto the image sensor through the opaque aperture layer and the metal aperture structure;
   wherein a spot size created by a light bundle passing through a microlens reaches a minimum at a top metal aperture layer of the metal aperture structure;
   wherein the metal aperture structure further includes a dielectric layer between the grounded metal aperture layers; and
   wherein each of the two grounded metal aperture layers has a thickness less than or equal to a thickness of the dielectric layer.

2. The optical fingerprint sensor of claim 1, wherein each of the grounded metal aperture layers further comprise an array of aperture stops aligned with a respective microlens of the MLA.

3. The optical fingerprint sensor of claim 2, wherein the metal aperture structure has an aspect ratio $h/d \geq 1$, where h is a height of the metal aperture structure between a surface of the image sensor and a top surface of an uppermost grounded metal aperture layer farthest from the image sensor, and d is a diameter of the aperture stops in the uppermost grounded metal aperture layer.

4. The optical fingerprint sensor of claim 3, wherein the diameter of the aperture stops of the uppermost grounded metal aperture layer is smaller than the diameter of the aperture stops of lower grounded metal aperture layers.

5. The optical fingerprint sensor of claim 4, wherein the diameter of the aperture stops of each grounded metal aperture layer is smaller than the diameter of the aperture stops of next lower grounded metal aperture layer.

6. The optical fingerprint sensor of claim 1, wherein the metal aperture structure includes two to four grounded metal aperture layers.

7. The optical fingerprint sensor of claim 1, wherein the grounded metal aperture layers comprise an anti-reflection layer deposited upon and beneath the grounded metal aperture layers.

8. The optical fingerprint sensor of claim 7, wherein a reflectance of the grounded metal aperture layers with anti-reflection layers is less than 5 percent.

9. The optical fingerprint sensor of claim 1, wherein the opaque aperture layer further comprises one opaque baffle-layer having an array of aperture stops and two transparent layers, and the metal aperture structure further comprises four grounded metal aperture layers each having an array of aperture stops corresponding to the array of aperture stops in the opaque aperture layer.

10. The optical fingerprint sensor of claim 1, wherein the opaque aperture layer further comprises two opaque baffle-layers each having an array of aperture stops and two transparent layers, and the metal aperture structure further comprises four grounded metal aperture layers each having an array of aperture stops corresponding to the arrays of aperture stops in the opaque aperture layer.

11. The optical fingerprint sensor of claim 10, wherein the aperture stops in each of three grounded metal aperture layers above the image sensor have the same diameter.

12. The optical fingerprint sensor of claim 1, wherein the opaque aperture layer further comprises two opaque baffle-layers each having an array of aperture stops and three transparent layers, and the metal aperture structure further comprises four grounded metal aperture layers each having an array of aperture stops corresponding to the arrays of aperture stops in the opaque aperture layer.

13. The optical fingerprint sensor of claim 12, wherein the aperture stops in each of three grounded metal aperture layers above the image sensor have the same diameter.

14. The optical fingerprint sensor of claim 1, wherein the opaque aperture layer further comprises three opaque baffle-layers each having an array of aperture stops and a diameter of the aperture stops in an upper opaque baffle-layer is wider than a diameter of the aperture stops in a lower opaque baffle layer.

15. The optical fingerprint sensor of claim 1, further comprising an infrared cutoff filter (IRCF) layer.

16. The optical fingerprint sensor of claim 15, wherein the IRCF layer is embedded between the opaque aperture layer and the metal aperture structure.

17. The optical fingerprint sensor of claim 15, further comprising a microlens array (MLA) above the opaque aperture layer and a cover glass layer above the MLA, the IRCF layer is coated on a surface of the cover glass layer adjacent to the MLA, and an upper surface of the cover glass layer forms the object plane.

* * * * *